W. DE F. CROWELL.
WINDSHIELD FOR VEHICLES.
APPLICATION FILED JAN. 23, 1919.
1,403,488.
Patented Jan. 17, 1922.
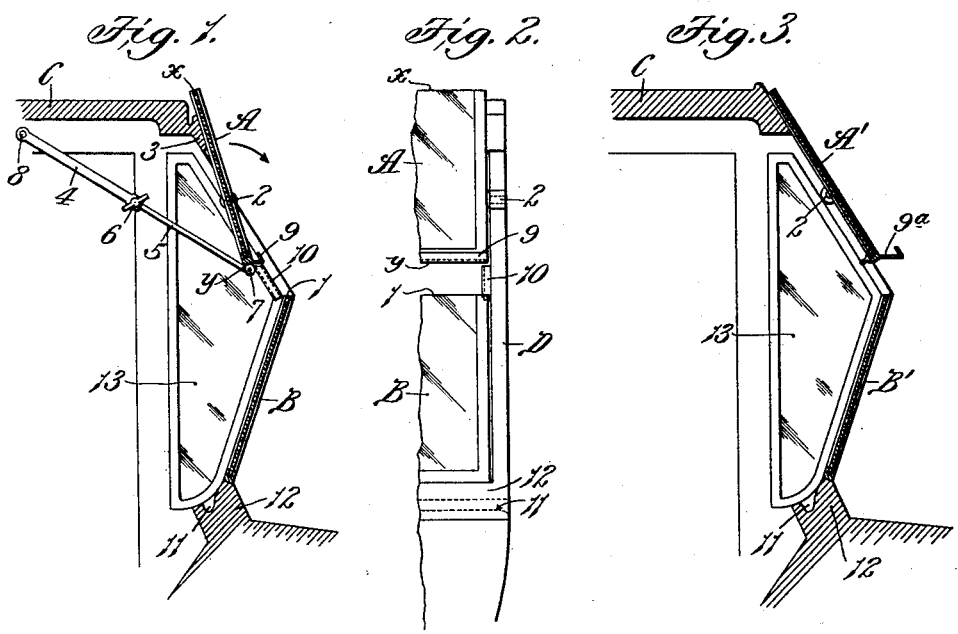
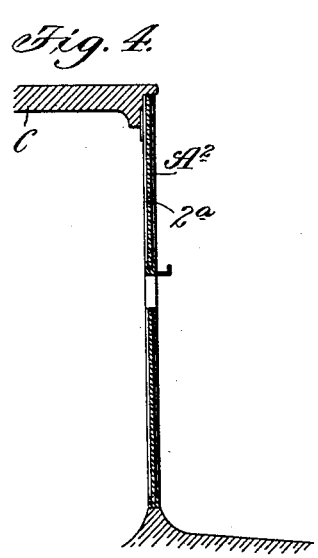
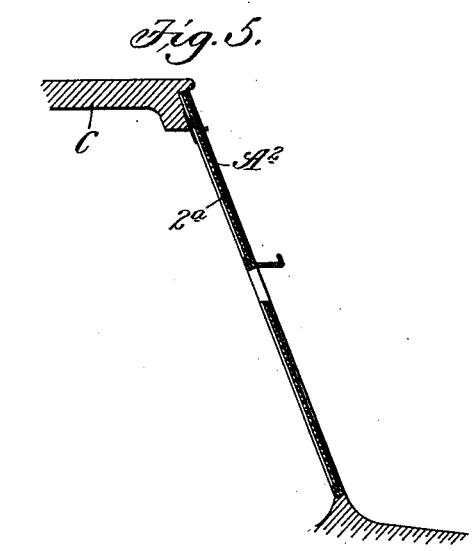
Inventor,
W. D. Crowell.
By Bakewell Cornwell attys.

UNITED STATES PATENT OFFICE.

WILLIAM DE F. CROWELL, OF ST. LOUIS, MISSOURI.

WINDSHIELD FOR VEHICLES.

1,403,488.   Specification of Letters Patent.   Patented Jan. 17, 1922.

Application filed January 23, 1919. Serial No. 272,722.

*To all whom it may concern:*

Be it known that I, WILLIAM DE F. CROWELL, a citizen of the United States, residing at St. Louis, Missouri, have invented a certain new and useful Improvement in Windshields for Vehicles, of which the following is a full, clear, and exact description, such as will enable others skilled in the art to which it appertains to make and use the same.

This invention relates to wind shields of the kind that are used on automobiles, motor boats and other conveyances, and particularly to wind shields of the type that are provided with a transverse slot, gap or open space which affords a clear vision for the driver or operator in inclement weather.

One object of my present invention is to provide a wind shield that is adapted to be used with a vehicle provided with a top or roof and which is of such design that it can be easily converted into a clear vision shield in stormy weather by simply revolving the top member of the shield upside down so as to bring the upper edge of said top member into sufficiently close proximity to the upper edge of the bottom member of the shield to form a horizontally-disposed slot or gap of sufficient height to afford a clear view for the driver without liability of rain beating inwardly through said slot in great quantities, said top member being so mounted that it lies in substantially the same plane in both of its positions, thereby eliminating open spaces between the top member and the frame of the wind shield when said top member is inverted.

Another object is to provide a clear vision wind shield that is equipped with means for preventing the rain that drains down the front side of the top member of the wind shield from being blown inwardly through the clear vision slot of the shield.

And still another object is to provide a wind shield whose top member is adapted to be revolved upside down so as to form a clear vision slot between said top member and the bottom member of the shield, the top member being equipped with a trough or gutter that lies at the top side of the shield, out of the way, when the top member is in its closed position, but which moves into operative position to collect the water that drains down the front side of the top member when said top member is inverted or revolved into its open position.

Figure 1 of the drawings is a vertical sectional view of a wind shield constructed in accordance with my present invention designed for use on an automobile provided with a closed body.

Figure 2 is a front elevational view of said wind shield; and

Figures 3, 4 and 5 are vertical sectional views, illustrating other forms of my invention.

Referring to Figures 1 and 2 of the drawings which illustrate one form of my invention, A and B designate the top and bottom members, respectively, of my improved wind shield. The bottom member can either be stationarily mounted or adjustably mounted, but the top member A is pivotally mounted in such a manner that it can be revolved upside down so as to form a clear vision slot between the members A and B without materially changing the angle of said top member or destroying the comparatively snug fit between said top member and the frame of the shield or the supporting structure in which the top member A is mounted. When the top member A is arranged in what I will term its "closed" position the lower edge $x$ of said member will be positioned in sufficiently close proximity to the upper edge 1 of the bottom member B of the shield to prevent rain, wind, snow and the like from beating inwardly into the vehicle for which the wind shield serves as a closure, and when said top member is revolved upside down into what I will term its "open" position the upper edge $y$ of said member A will be spaced far enough away from the upper edge 1 of the bottom member of the shield to form a slot, gap or open space of from one to two inches in height that extends transversely across the shield, and thus affords an unobstructed view for the driver of the vehicle in inclement weather. I accomplish this desirable result by locating the pivot points 2 of the top member A closer to the upper edge $y$ of said member than to the lower edge $x$ of said member. When the top member A is arranged in its open position, as shown in Figure 1, the upper edge $y$ of said member will be positioned at the rear of and slightly above the upper edge 1 of the bottom member B of the shield, thus forming a clear vision slot or gap that is on a horizontal, or substantially horizontal, line with the eyes of the driver of the vehicle, the portion of said top member A which is then located at the upper edge of the shield being positioned in front of the front end of the roof or top C of the vehicle, preferably in contact with a depending flange 3 on the top C. By revolving the top member A of the shield in the direction indicated by the arrow in Figure 1, the lower edge x of said member will be brought into sufficiently close proximity to the upper edge 1 of the bottom member of the shield to prevent rail, snow, wind and the like from blowing inwardly through the shield, and the upper edge y of said top member will be brought into close proximity to the top C of the vehicle and behind the depending flange 3 on the top C. I realize that it is old to pivotally mount the top member of a wind shield, but my improved shield is distinguished from prior wind shields provided with a pivotally mounted top member, in that the top member of my improved shield is so arranged that it is adapted to be revolved upside down so as to form a slot, gap or open space of from one to two inches in height that affords an unobstructed view for the driver or operator in inclement weather, without liability of permitting rain to beat inwardly through said slot in great quantities. Furthermore, my wind shield is so constructed that when the top member is inverted or turned upside down, it will lie in substantially the same plane it occupied when in its closed position and will fit the frame of the shield practically as snugly. Consequently, there will be no open spaces between the top member of the shield and the frame or supporting structure for said top member, through which wind, rain, snow and the like can beat into the vehicle. Nor will the top member of the shield lie in such a position that it has a tendency to force the air that strikes same downwardly through the clear vision slot. Any suitable means can be used for adjusting the top member A of the shield and holding it in adjusted position, the means shown in Figure 1 of the drawings consisting of a link composed of two telescoped parts 4 and 5 adjustably connected together by a set screw 6 and having its opposite ends pivotally connected at 7 and at 8 to the top member A of the shield and to the top C of the vehicle, respectively. The bottom member B of the shield slopes upwardly and forwardly, as shown in Figure 1, and the top member A of the shield is preferably inclined or sloped in the opposite direction.

In order to prevent the rain that drains down the front side of the top member A of the shield from being blown inwardly through the clear vision slot formed by the space between the edges y and 1 of the members A and B, respectively, I have provided the top member A with a gutter or trough 9 that extends transversely of the member A in close proximity to the lower edge y of said member. When the top member A of the shield is in its open position, as shown in Figure 1, the trough or gutter 9 will be positioned on the front side of said member at the upper side or edge of the clear vision slot. In rainy weather the rain that drains down the front side of the member A will collect in the trough 9, and thus be prevented from being blown inwardly through the clear vision slot in the shield. When the top member A is in its closed position the trough 9 will be arranged out of the way in close proximity to the top of the vehicle. Any suitable means can be used for conducting the water out of the trough or gutter 9, the means shown in Figure 1 for this purpose consisting of rain ducts 10 arranged adjacent the opposite ends of the trough 9 so as to receive the water from said trough and discharge said water onto the rear side of the bottom member B of the shield down which said water drains to a duct or channel 11 which leads to a point or points on the outside of the body of the vehicle. The drain ducts 10 are preferably carried by the side standards of the frame or portions D of the body of the vehicle in which the top and bottom members B of the shield are mounted, and the channel 11 is preferably formed in a transversely-disposed member 12 on the cowl of the vehicle that is arranged at the lower edge of the bottom member B of the shield. The sides of the body of the vehicle, whether they consist of curtains or permanent panels, preferably comprise forwardly-projecting extensions or portions 13 that terminate at the side standards of the frame of the shield in which the members A and B are mounted.

If desired, the top member of the shield can be so mounted that when it is in its open position the trough or gutter on said member will project forwardly beyond the upper edge 1 of the bottom member of the shield. In Figure 3 of the drawings I have shown a wind shield constructed in this manner, the top member A' of the shield being set at a slightly different angle than the top member of the shield shown in Figure 1 when in its open position and provided at its upper edge with a trough or gutter 9ᵃ that projects forwardly beyond the front side of the bottom member B' of the shield when said top member is inverted. When the wind shield is constructed in the manner shown in Figure 3 it is not necessary to use drain ducts 10 at the ends of said gutter or trough, owing to the fact that said trough lies in advance instead of at the rear of the upper edge of the bottom member of the shield. While I prefer to provide the shield with a bottom member which slopes oppositely to the top member of the shield, this is not essential, for if desired, both the top and bottom members of the shield could be arranged vertically, as shown in Figure 4, or inclined rearwardly, thus producing a sloping wind shield, as shown in Figure 5. In each of the forms of my invention shown in Figures 4 and 5 the top member A² of the shield is pivotally mounted at 2ᵃ in such a manner that said member can be revolved in one direction so as to turn said member upside down and produce a clear vision slot, and revolved in the opposite direction so as to form a practically solid panel which protects the driver and occupants of the vehicle from rain, wind, snow and the like.

As previously stated, one object of my present invention is to provide a clear vision wind shield which is so constructed that the water which drains down the front side of the top member of the shield cannot blow inwardly through the clear vision slot. I accomplish this by providing the top member of the shield with the trough or gutter previously described that projects forwardly from the front side of said member at the upper edge of the clear vision slot. So far as this feature of my invention is concerned, it is immaterial how the top member of the shield is mounted or whether it be rigid or adjustable.

Having thus described my invention, what I claim and desire to secure by Letters Patent is:

1. A clear vision wind shield for vehicles equipped with a top or roof, comprising a bottom member, and a revoluble top member arranged in such a position with relation to said bottom member and the roof of the vehicle that the roof will not interfere with the movement of said top member when it is revolved upside-down so as to space one edge of same far enough away from the upper edge of said bottom member to form a clear vision slot.

2. A clear vision wind shield for vehicles equipped with a top or roof, comprising a stationary bottom member, and a pivotally mounted top member that closes the space between said bottom member and roof when it is arranged in one position and adapted to be revolved upside-down so as to space one edge of same far enough above the upper edge of said bottom member to form a clear vision slot, said top member being so arranged with relation to the roof of the vehicle that said roof does not interfere with the movement of said top member when it is revolved into the position last referred to.

3. In a vehicle, the combination of a top or roof, and two transversely-disposed panels that form a closure for the front of the vehicle, the top panel being revolubly mounted and so arranged with relation to the roof and the bottom panel that the roof will not prevent said top panel from being turned upside-down into a position wherein one edge portion of same is spaced far enough away from the bottom panel to form a clear vision slot.

4. A clear vision wind shield for vehicles, comprising a forwardly-inclined bottom member whose upper edge terminates at a point in advance of the front end of the roof of the vehicle, and a revoluble, rearwardly-inclined upper member so arranged with relation to said roof and bottom member that it is capable of being turned completely upside-down so as to space one edge of same far enough away from the top edge of said bottom member to form a clear vision slot.

5. A wind shield provided with a pivotally mounted top member that is adapted to be revolved upside down so as to space the upper edge of same far enough away from the bottom part of the shield to form a clear vision slot, and a trough or gutter extending transversely across said top member in close proximity to the upper edge of same so as to form a gutter at the upper side of the clear vision slot when said top member is inverted.

6. A wind shield, comprising a bottom member, a pivotally mounted top member that is adapted to be revolved in one direction so as to turn said member upside down and form a clear vision slot between the adjacent horizontal edges of said members and revolved in the opposite direction so as to bring said members into sufficiently close proximity to each other to prevent rain from beating inwardly through the shield, and an adjustable link pivotally connected to said top member for holding it in adjusted position.

7. A wind shield for vehicles, comprising a forwardly inclined bottom member, and a rearwardly inclined top member, said top member being pivotally mounted in such a manner that it can be revolved in opposite directions into substantially the same plane so as to bring the lower horizontal edge of same into close proximity to the upper edge of the bottom member of the shield or the upper horizontal edge of said top member into such a position with relation to the bottom member of the shield that a clear vision slot is formed between said members, and a transversely-disposed gutter or trough on said top member arranged in proximity to the upper edge of same for collecting the water that drains down the front side of said member when the said member is inverted to form a clear vision slot.

8. A wind shield for vehicles, comprising a forwardly inclined bottom member, a rearwardly inclined top member, said top member being pivotally mounted in such a manner that it can be turned in one direction so as to bring one of the horizontal edges of same into close proximity to the upper edge of the bottom member of the shield and turned in the opposite direction into substantially the same plane it formerly occupied so as to bring the other horizontal edge of said top member into such a position with relation to the bottom member of the shield that a clear vision slot is formed between said members, a transversely-disposed gutter or trough on said top member for collecting the water that drains down the front side of said member when the clear vision slot is in use, and means for conducting away the water that collects in said gutter.

9. A wind shield, comprising a bottom member, a pivotally mounted top member that is adapted to be turned in one direction so as to form a clear vision slot between said members and in the opposite direction to close said slot, and means arranged at the upper edge of said top member for preventing the rain that drains down the front side of said top member from being blown inwardly through said clear vision slot when said top member is inverted.

10. A wind shield provided with a pivotally mounted top member that is adapted to be turned upside down into substantially the same plane it formerly lay in so as to bring the upper edge of said member into such a position with relation to the bottom member of the shield that a clear vision slot is formed between said members, and a gutter or trough on the upper edge of said member that lies at the upper edge of the shield when said top member is in its closed position and at the upper side of the clear vision slot when said top member is inverted or in its open position.

WILLIAM DE F. CROWELL.